(12) United States Patent
Oonishi et al.

(10) Patent No.: US 10,942,436 B2
(45) Date of Patent: Mar. 9, 2021

(54) VIDEO PROJECTOR HAVING VIDEO DISPLAY ELEMENT WITH REFLECTION SURFACE FORMED OF A PLURALITY OF MICROMIRRORS

(71) Applicant: Hitachi-LG Data Storage, Inc., Tokyo (JP)

(72) Inventors: Kunikazu Oonishi, Tokyo (JP); Satoshi Ouchi, Tokyo (JP); Seiji Murata, Tokyo (JP); Hiroshi Ogasawara, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 16/469,178

(22) PCT Filed: Oct. 23, 2017

(86) PCT No.: PCT/JP2017/038121
§ 371 (c)(1),
(2) Date: Jun. 13, 2019

(87) PCT Pub. No.: WO2018/138986
PCT Pub. Date: Aug. 2, 2018

(65) Prior Publication Data
US 2020/0103740 A1    Apr. 2, 2020

(30) Foreign Application Priority Data

Jan. 30, 2017   (JP) .............................. JP2017-013786

(51) Int. Cl.
*G03B 21/20*   (2006.01)
*G02B 26/08*   (2006.01)
(Continued)

(52) U.S. Cl.
CPC ..... *G03B 21/2066* (2013.01); *G02B 26/0833* (2013.01); *G02B 26/101* (2013.01); *G03B 21/008* (2013.01)

(58) Field of Classification Search
CPC .............. G03B 21/2066; G03B 21/008; G02B 26/0833; G02B 26/101
See application file for complete search history.

(56) References Cited

U.S. PATENT DOCUMENTS 6,322,219 B1 * 11/2001 Okamori ................ G03B 21/28
                                                        348/771
6,560,048 B1 *  5/2003 Okamori .............. G02B 27/283
                                                        348/E5.142
(Continued)

FOREIGN PATENT DOCUMENTS

CN   102119358 A   7/2011
CN   105573033 A   5/2016
(Continued)

OTHER PUBLICATIONS

International Search Report of PCT/JP2017/038121 dated Jan. 30, 2018.
(Continued)

*Primary Examiner* — Michelle M Iacoletti
*Assistant Examiner* — Magda Cruz
(74) *Attorney, Agent, or Firm* — Mattingly & Malur, PC

(57) ABSTRACT

The reflection surface of a DMD is divided into a first area and a second area, causing the first area to display images while appropriately controlling the on and off states of the micromirrors within the second area on the basis of a prescribed control logic according to the on and off states of the micromirrors within the first area. Further, the DMD off-state light created in the first and second areas is caused to recurse to the DMD via a prescribed recycle optical system for the DMD off-state light, and only the second area (Continued)

in the reflection surface is intensively irradiated along a prescribed irradiation direction, thereby efficiently converting the DMD off-state light to the effective projection light.

4 Claims, 8 Drawing Sheets

(51) Int. Cl.
*G02B 26/10* (2006.01)
*G03B 21/00* (2006.01)

(56) References Cited

U.S. PATENT DOCUMENTS

| | | | | |
|---|---|---|---|---|
| 7,961,399 | B2* | 6/2011 | Penn | G02B 26/0841 |
| | | | | 359/634 |
| 2002/0180934 | A1* | 12/2002 | Shimizu | H04N 9/3141 |
| | | | | 353/30 |
| 2003/0147158 | A1* | 8/2003 | Penn | G03B 21/008 |
| | | | | 359/833 |
| 2003/0151834 | A1* | 8/2003 | Penn | H04N 9/3105 |
| | | | | 359/833 |
| 2003/0189748 | A1 | 10/2003 | Wang | |
| 2005/0024594 | A1* | 2/2005 | Kumai | H04N 5/7458 |
| | | | | 353/33 |
| 2007/0024825 | A1 | 2/2007 | De Vaan | |
| 2007/0247591 | A1* | 10/2007 | Shyu | G03B 21/008 |
| | | | | 353/33 |
| 2008/0246705 | A1 | 10/2008 | Russell et al. | |
| 2009/0161077 | A1* | 6/2009 | Maeda | G03B 21/005 |
| | | | | 353/31 |
| 2013/0135592 | A1 | 5/2013 | Okuda | |
| 2013/0242272 | A1* | 9/2013 | Baba | H04N 9/3152 |
| | | | | 353/81 |
| 2014/0347634 | A1 | 11/2014 | Bommerbach et al. | |
| 2016/0116831 | A1* | 4/2016 | Haga | G02B 7/1805 |
| | | | | 353/69 |
| 2016/0173853 | A1* | 6/2016 | Yu | H04N 13/243 |
| | | | | 348/48 |
| 2016/0216599 | A1* | 7/2016 | Chien | G02B 17/08 |
| 2016/0299417 | A1 | 10/2016 | Lambot | |
| 2017/0205040 | A1 | 7/2017 | Seitz | |
| 2018/0348413 | A1* | 12/2018 | Imaoka | G02B 26/02 |
| 2019/0011813 | A1* | 1/2019 | Sawai | G02B 27/126 |

FOREIGN PATENT DOCUMENTS

| | | |
|---|---|---|
| CN | 105793744 A | 7/2016 |
| JP | 10-82959 A | 3/1998 |
| JP | 2003-121784 A | 4/2003 |
| JP | 2013-114229 A | 6/2013 |
| JP | 2017-135106 A | 8/2017 |

OTHER PUBLICATIONS

Extended European Search Report received in corresponding European Application No. 17893640.7 dated Oct. 26, 2020.
Chinese Office Action received in corresponding Chinese Application No. 2017800768573 dated Oct. 30, 2020.

* cited by examiner

F I G. 1
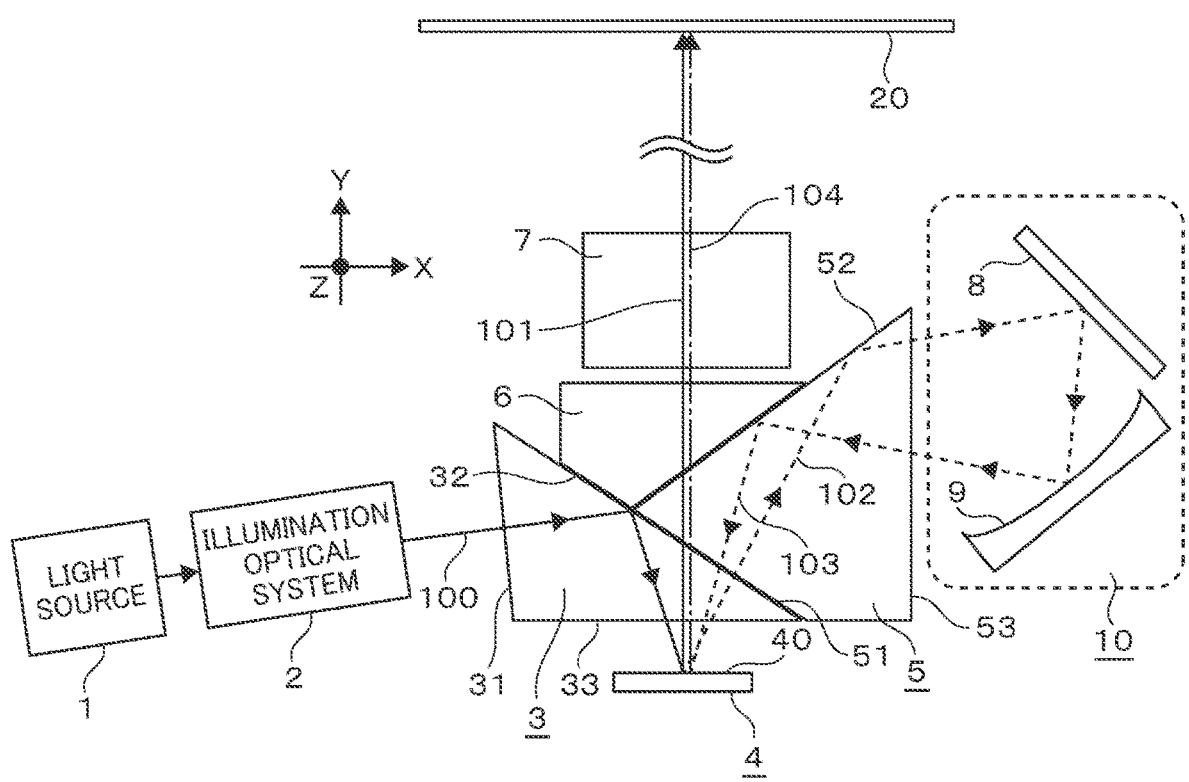

(a) ON STATE (b) OFF STATE

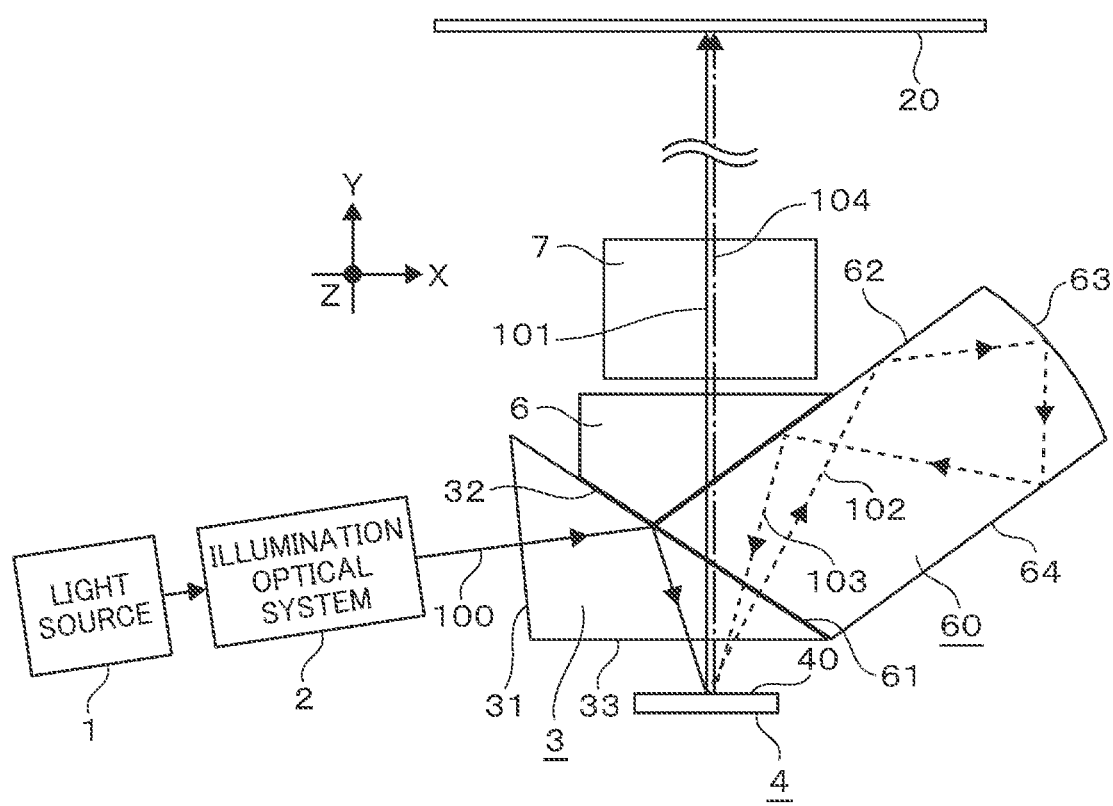
F I G. 6

F I G. 7
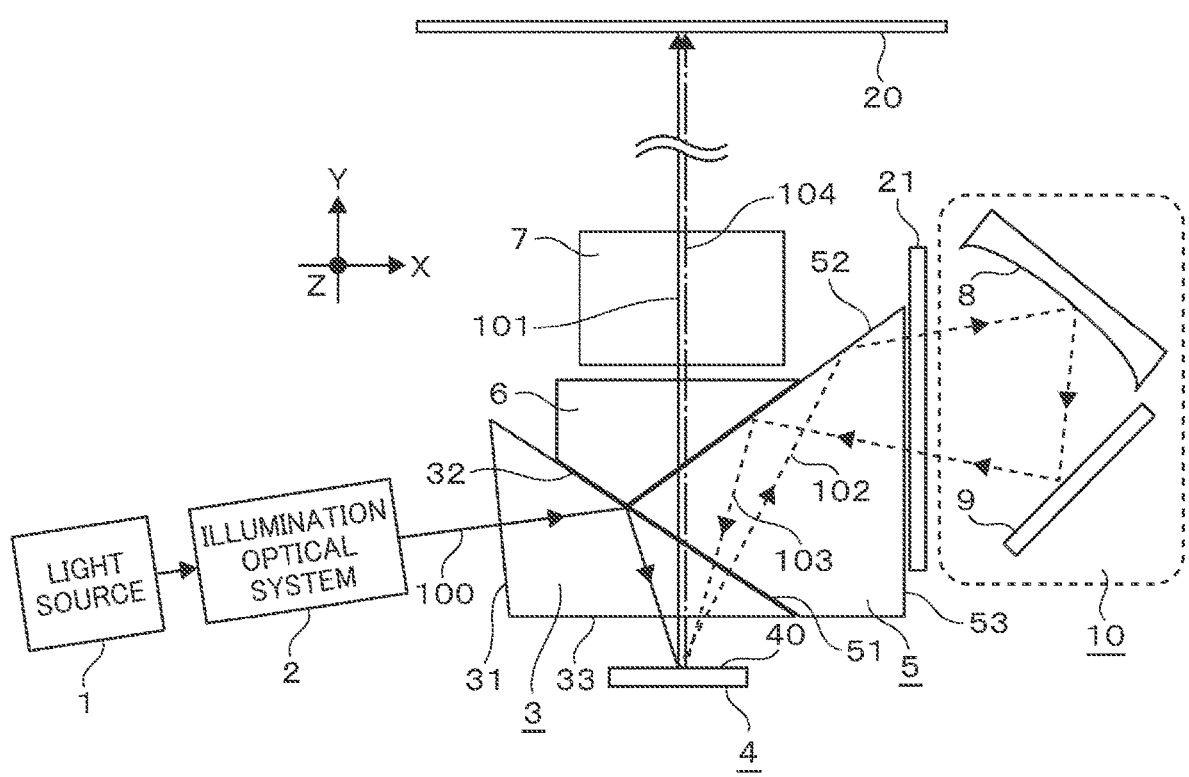

VIDEO PROJECTOR HAVING VIDEO DISPLAY ELEMENT WITH REFLECTION SURFACE FORMED OF A PLURALITY OF MICROMIRRORS

TECHNICAL FIELD

The present invention relates to a video projector having a function of displaying and projecting an image by irradiating a digital micromirror device (DMD) provided with a plurality of micromirrors with predetermined illumination light, and particularly, to an optical system configuration of the video projector.

BACKGROUND ART

A DMD is a type of video display element and has a structure in which movable micromirrors having a function of selectively tilting in a first direction and a second direction different from each other are regularly arranged, and each micromirror corresponds to one pixel of a display image.

When illumination light is incident on such a DMD in a predetermined direction, the illumination light incident on a micromirror in a state (DMD on-state) of being tilted in the first direction is reflected by the micromirror and, after that, passes through a predetermined projection lens to be projected and irradiated on a predetermined projection surface. On the other hand, the illumination light reflected by the micromirror in a state (DMD off-state) of being tilted in the second direction follows an optical path different from that of the light reflected from the micromirror in the DMD on-state described above, and thus, the light is incident on and absorbed by, for example, a predetermined light shielding plate without being incident on the projection lens.

Therefore, in the video projector in the related art in which the DMD is mounted as a video display element, video display is realized by appropriately switching the on state and the off state of each micromirror arranged in the DMD on the basis of a predetermined video signal and controlling the amount of light projected and irradiated on the projection surface pixel by pixel.

However, since the video display by the DMD is based on the principle as described above, the light (DMD off-state light) reflected by the micromirror in the DMD off-state does not contribute at all to ensuring luminance of the projection image. As a result, in the DMD mounted video projector in the related art, there is a problem that the presence of the DMD off-state light as described above becomes a serious inhibiting factor to light use efficiency of the video projector.

CITATION LIST

Patent Document

Patent Document 1: JP 2003-121784 A

SUMMARY OF THE INVENTION

Problems to be Solved by the Invention

In order to solve the problems, for example, the aforementioned Patent Document discloses an optical means intending to improve light use efficiency by allowing DMD off-state light to recurse to an illumination light source side by using a predetermined spherical surface mirror and, thus, reusing a portion of the light amount as illumination light.

However, since this means disclosed in the patent document has a structure in which the DMD off-state light follows the long light path from the illumination light source on the most root side of the optical system to the DMD in the completely opposite direction with respect to the forward light or follows the separately-provided bypass light path to recurse to the illumination light source, the loss of light amount generated during the traveling on the recursion light path cannot be ignored, and only a portion of the light amount due to the structure of the light source even for the DMD off-state light that has recursed to the illumination light source side can be reused as the illumination light. As a result, there is a technical problem that the improvement effect of the light use efficiency by this means disclosed in the patent document is extremely small.

The present invention has been made under the circumstances described above, and an object thereof is to provide a new DMD-mounted video projector with improved light use efficiency by improving brightness (luminance) of a projection image by efficiently reusing the DMD off-state light as the projection light.

Solutions to Problems

The above object is achieved by optical means disclosed in the claims. More specifically, for example, according to the present invention, there is provided a video projector for projecting an image, including: a video display means having a reflection surface in which a plurality of micromirror surfaces which can be selectively tilted in a first direction and a second direction which are different from each other are regularly arranged; an illumination means that irradiates the reflection surface with predetermined illumination light; and a projection lens having a function of projecting and irradiating a predetermined projection surface with illumination light that is reflected by at least the micromirror surface tilted in at least the first direction among the illumination light with which the illumination means irradiates the reflection surface, in which the reflection surface is divided into at least a first area and a second area, in which each of the micromirror surfaces in the first area selectively switches tilting in the first direction or the second direction on the basis of a predetermined first control signal, in which each of the micromirror surfaces in the second area selectively switches the tilting in the first direction or the second direction on the basis of a predetermined second control signal which is different from the first control signal, and in which the respective areas are irradiated with the first illumination light for irradiating at least the first area and the second illumination light for irradiating at least the second area from different directions.

Effects of the Invention

According to the present invention, DMD off-state light generated at the time of video display and the like can be efficiently allowed to recurse to a DMD, and thus, a projection surface can be irradiated with further effective projection light, so that it is possible to favorably improve brightness (luminance) of a projection image or light use efficiency of a video projector.

BRIEF DESCRIPTION OF THE DRAWINGS

FIG. 1 is a schematic diagram of an optical system of a video projector according to a first embodiment of the present invention.

FIG. 6 is a schematic diagram of an optical system of a video projector according to a second embodiment of the present invention.

FIG. 7 is a schematic diagram of an optical system of a video projector according to a third embodiment of the present invention.

MODE FOR CARRYING OUT THE INVENTION

Figure 2:
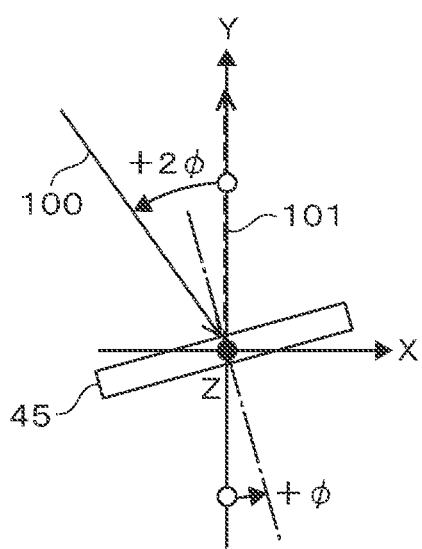
FIG. 2 is a schematic diagram for describing operations of a DMD micromirror used in the present invention.
Figure 2:
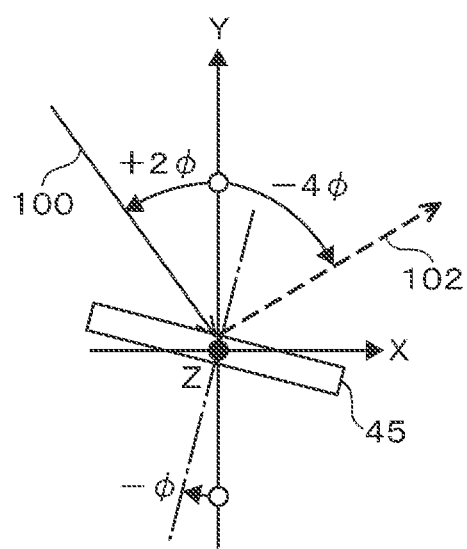

Hereinafter, embodiments of the present invention will be described with reference to the drawings.

First Embodiment

FIG. 1 is a schematic diagram of an optical system of a video projector according to a first embodiment of the present invention. A light source 1 emits predetermined illumination light. In the present invention, any light source such as various lamps, LEDs, lasers, and phosphors may be used as the light source 1.

The illumination light emitted from the light source 1 passes through an illumination optical system 2 and is converted into substantially parallel illumination light 100 having a predetermined light flux diameter. In addition, in FIG. 1, for the better understanding of the description, the traveling path (optical path) of each light including the illumination light 100 is indicated by a solid line, a broken line, or a one-dot dashed line. In addition, the illumination optical system 2 may be an optical system having any configuration as long as the optical system has a function of shaping the illumination light emitted from the illumination light source 1 into a predetermined light flux suitable for being irradiated on the DMD described later. Therefore, the detailed description of the specific configuration of the illumination optical system 2 is omitted.

Next, the illumination light 100 emitted from the illumination optical system 2 is incident on a sidewall surface 31 of a first total internal reflection (TIR) prism 3 and travels in the prism to reach a sidewall surface 32. The first TIR prism 3 is a triangular prism made of an optical glass, a plastic for an optical component, or the like having a predetermined refractive index n1. Since the illumination light 100 reaching the sidewall surface 32 is incident on the sidewall surface 32 at a larger incidence angle than a predetermined total reflection angle determined by the ratio of the refractive index n1 and the refractive index of the contact air layer, the light is totally reflected on the sidewall surface 32 and travels in the prism again, and then is emitted from a sidewall surface 33 to the outside of the prism. Then, the illumination light 100 emitted from the first TIR prism 3 is incident on a DMD 4 as a video display element at a predetermined angle and is illuminated on the reflection surface 40 in the DMD 4 with a substantially uniform illuminance or a predetermined illuminance distribution.

As described in the background art, a plurality of micromirrors having a function of selectively switching a state of being tilted in a first direction or a state of being tilted in a second direction different from the first direction on the basis of a predetermined control signal are regularly arranged on the reflection surface 40 in the DMD 4.

Therefore, as illustrated in FIG. 2, as an example, each micromirror 45 arranged on the reflection surface 40 has a structure of rotating with the Z axis direction (direction vertical to the drawing) of the drawing as a main rotation axis and has a function of rotating in either a state (on state) in which the normal line of the reflection surface is tilted by an angle of +φ (counterclockwise rotation as viewed from the Y-axis is represented as plus) with respect to the Y-axis direction (vertical direction axis in the drawing) as illustrated in FIG. 2(a) or a state (off state) of being tilted by an angle of −φ in the opposite direction as illustrated in FIG. 2(b). In addition, of course, the tilted form of the micromirror is not limited to the example illustrated in FIG. 2, and any tilted form may be used as long as the micromirrors in the on state and the off state are tilted in different directions.

In the present embodiment, one of the features is that the reflection surface 40 configured with the plurality of micromirrors of the DMD 4 is divided into two areas of a first area 41 and a second area 42. For example, FIG. 3 illustrates an example in which the reflection surface 40 is divided into two in the vertical direction (Z-axis direction), the upper half is defined as the first area 41, and the lower half is defined as the second area 42.

Figure 3:
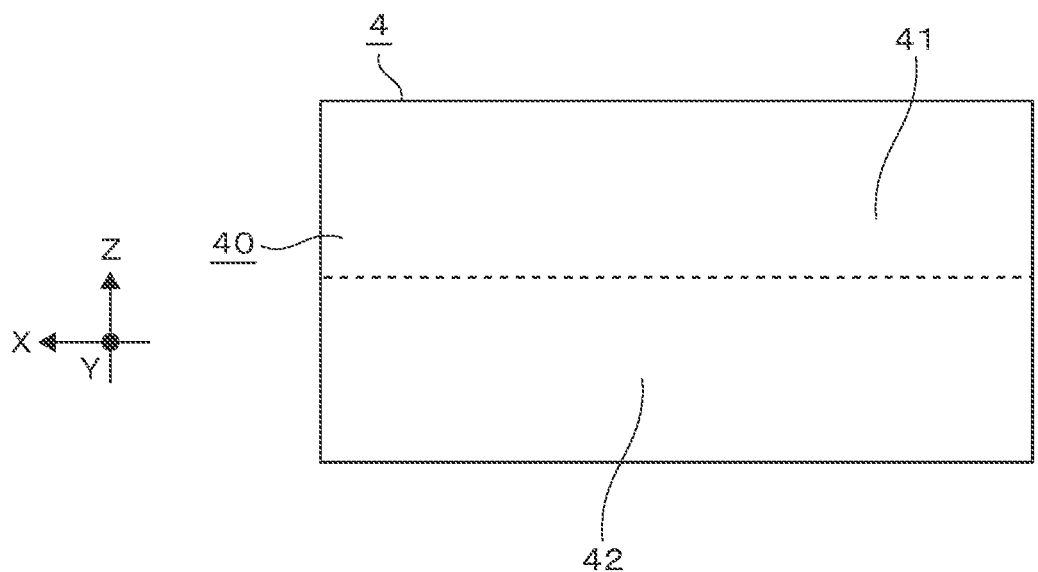
FIG. 3 is a schematic plan view illustrating an embodiment of a DMD reflection surface used in the present invention.
Figure 4:
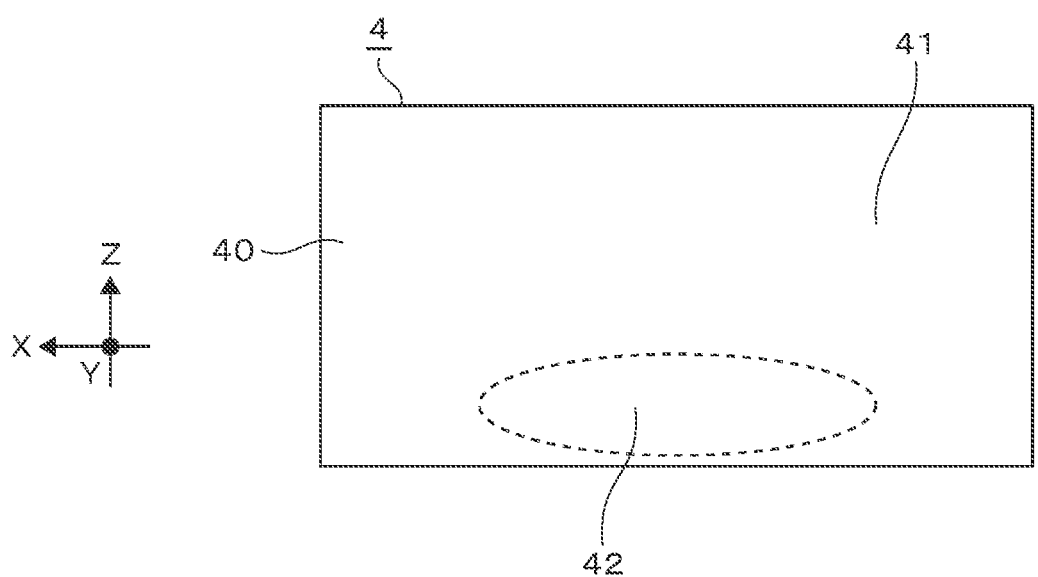
FIG. 4 is a schematic plan view illustrating another embodiment of the DMD reflection surface used in the present invention.

In addition, of course, the division form of the first area 41 and the second area 42 described above is not limited to the form illustrated in FIG. 3. There is no particular restriction on the area, shape, arrangement place, and the like of each of the first area and the second area, and any form may be employed. For example, in the example illustrated in FIG. 4, the second area 42 having a substantially elliptical shape is arranged below the central portion of the reflection surface 40, and the remaining reflection surface surrounding the second area is defined as the first area 41. However, there is no problem even if this division form is used. Furthermore, the arrangement number of the first and second areas is not limited to one for each of the first and second areas as in the example of FIG. 3 or FIG. 4, but there is no problem even if a plurality of the first area and a plurality of the second area are dispersedly arranged.

Furthermore, in the present embodiment, among the first area 41 and the second area 42 divided and arranged as described above, the video display is performed mainly by the micromirrors arranged in the first area 41, and the operating states of the micromirrors arranged in the second area 42 are controlled according to the operating state, that is, the on or off state of each micromirror in the first area 41.

Specifically, for example, in a case where all the micromirrors arranged in the first area 41 are unified into the on state (hereinafter, this state is referred to as a fully on mode), all the micromirrors arranged in the second area 42 are also unified into the on state similarly to the first area 41. On the contrary, in a case where all the micromirrors arranged in the first area 41 are unified into the off state (hereinafter, this state is referred to as a fully off mode), all the micromirrors arranged in the second area 42 are also unified into the off state.

On the other hand, in a case where an image is displayed in the first area 41, since each micromirror arranged in the first area 41 is selectively switched to the on state or the off state according to a control signal generated on the basis of a predetermined video display signal, the micromirrors in the on state and the micromirrors in the off state are mixed in the first area 41. In this case, all the micromirrors arranged in the second area 42 are switched to either the on state or the off state according to the number of micromirrors that are in the off state in the first area 41. That is, in a case where the number of micromirrors in the off state in the first area 41 is smaller than a predetermined threshold value N, all the micromirrors arranged in the second area 42 are unified into the on state, and conversely, in a case where the number of micromirrors in the off state is larger than the threshold value N, the micromirrors are unified into the off state.

In addition, the threshold value N can be determined, for example, as follows. As described later, in the optical system according to the present invention, if all the micromirrors arranged in at least the second area 42 are unified into the off state, the effective light called the DMD recycling light is emitted from the second area 42. In addition, as the number of micromirrors in the off state in the first area 41 is increased, the light amount of the DMD recycling light is also increased as described later. Therefore, in a case where the light amount of the DMD recycling light generated when the number of micromirrors in the off state in the first area 41 is gradually increased in a state in which all the micromirrors arranged in the second area 42 are unified into the off state exceeds the light amount of the effective light (DMD on-state light described later) emitted from the second area 42 conversely in a state in which all the micromirrors in the second area 42 are unified into the on state, the minimum number N of the micromirrors in the off state is defined as the threshold value.

In the present embodiment, by the above-described control logic, the operating situations, that is, the on or off states of all the micromirrors arranged in the second area 42 are appropriately controlled.

Then, the entire surface of the reflection surface 40 of the DMD 4 in which the micromirrors in each of the areas are controlled to the on state or the off state as described above is irradiated with the illumination light 100, for example, from the direction tilted by an angle of about +2φ with respect to the Y axis as illustrated in FIG. 2.

At this time, in the first area 41 and the second area 42, the illumination light 100 incident on the micromirror in the on state like the micromirrors 45 in FIG. 2(*a*) becomes light 101 (indicated by a solid line in the figure) that travels in a direction substantially parallel to the Y axis according to the law of reflection. Hereinafter, the light that follows such a reflection light path is referred to as DMD on-state light.

For example, this DMD on-state light 101 is incident on the TIR prism 3 from the sidewall surface 33 of the first TIR prism 3 again and travels in the TIR prism 3 along the light path indicated by the solid line in the optical system of FIG. 1, and at this time, the light is emitted from the sidewall surface 32. Then, the light from a sidewall surface 51 of the second TIR prism 5 arranged at the nearest position is incident on the TIR prism 5. The second TIR prism 5 is also a polygonal prism made of an optical glass, a plastic for an optical component having a predetermined refractive index n2, or the like. Then, among the sidewall surfaces, the light incident on at least one surface (sidewall surface 52 in the embodiment of FIG. 1) at an incidence angle larger than a predetermined total reflection angle determined by the ratio of the refractive index n2 to the refractive index of the contact air layer is set to be totally reflected.

The DMD on-state light 101 that is incident on the second TIR prism 5 travels the inner portion of the prism and reaches the sidewall surface 52. At this time, since the incidence angle of the DMD on-state light 101 on the sidewall surface 52 is set to be smaller than the total reflection angle of the sidewall surface 52 described above, the light passes through the sidewall surface 52 as it is and is emitted to the outside of the prism. Then, the light passes through an optical path length correcting prism 6, which is made of a predetermined optical glass, plastic for optical components or the like similarly to the first TIR prism 3 or the second TIR prism 5, and a projection lens 7 and is projected and irradiated as effective projection light on a predetermined projection surface 20 arranged in front of the projection lens 7.

On the other hand, in the first area 41 and the second area 42, the illumination light 100 incident on the micromirror in the off state as in the micromirror 45 in FIG. 2(*b*) becomes, at this time, light 102 (indicated by a broken line in the figure) travels in the direction tilted by an angle of about −4φ with respect to the Y axis according to the law of reflection similarly to the case of FIG. 2(*a*). Hereinafter, the light which follows such a reflection light path is referred to as DMD off-state light.

Similarly to the DMD on-state light 101, for example, the DMD off-state light 102 travels along the light path indicated by the broken line in the optical system of FIG. 1 and is incident on the TIR prism 3 from the sidewall surface 33 of the first TIR prism 3 again. The light travels in the TIR prism 3 and is emitted from the sidewall surface 32. Then, the light that is incident on the TIR prism 5 from the sidewall surface 51 of the second TIR prism 5 arranged at the nearest position, travels in the TIR prism 5, and reaches the sidewall surface 52. At this time, since the incidence angle of the DMD off-state light 102 on the sidewall surface 52 is set to be larger than the total reflection angle of the sidewall surface 52 unlike the DMD on-state light 101, the light is totally reflected on the sidewall surface 52, passes through a sidewall surface 53, and is emitted from the second TIR prism 5.

The DMD off-state light 102 emitted from the second TIR prism 5 is incident on a DMD off-state light recycle (reuse) optical system 10 configured with a predetermined optical system. The DMD off-state light recycle optical system 10 is an optical system having a function of deflecting the light path of the DMD off-state light 102 and allowing the light to be recursively irradiated to the DMD 4, and as a specific configuration example thereof, for example, the embodiment of FIG. 1 discloses an optical system that is configured with a plane mirror 8 and a toric surface mirror 9 (having curved surfaces having different radii of curvature between a predetermined cross section and a cross section perpendicular thereto).

The DMD off-state light 102 incident on the DMD off-state light recycle optical system 10 is reflected sequentially by the plane mirror 8 and the toric surface mirror 9 to deflect the light path thereof and is incident on the inside of the second TIR prism 5 from the sidewall surface 53 again. Then, the light travels in the second TIR prism 5 and is totally reflected again by the sidewall surface 52, and after that, DMD off-state recursion light 103 is emitted from the sidewall surface 51 of the second TIR prism 5, passes through the first TIR prism 3, and re-irradiated on the reflection surface 40 of the DMD 4.

At this time, as specific optical conditions, by appropriately designing the surface shape, the installation position, the installation angle, and the like of each optical component, for example, the plane mirror 8 and the toric surface mirror 9 in the embodiment of FIG. 1, constituting the DMD off-state light recycle optical system 10, only the second area 42 in the reflection surface 40 is set to be intensively irradiated with the DMD off-state recursion light 103 from the direction tilted by an angle of about −2φ with respect to the Y axis, and the inner portion of the second area 42 is set to be re-irradiated with the illumination light having a very uniform illuminance or a gradually changing illuminance distribution.

As a result, in the video display mode or the fully off mode, almost all light of the DMD off-state light 102 generated from both the first area 41 and the second area 42 on the reflection surface 40 of the DMD 4 is incident, as the DMD off-state recursion light 103, on the micromirrors arranged in the second area 42 from the direction tilted by an angle of about −2φ with respect to the Y axis.

Figure 5:
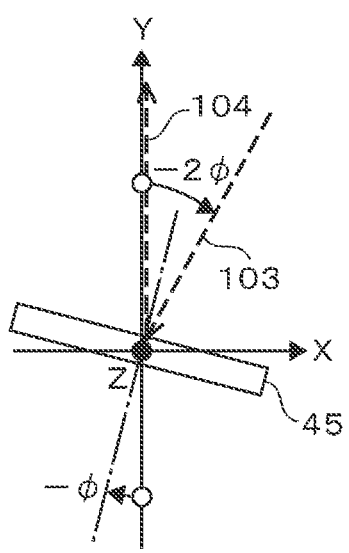
FIG. 5 is a schematic diagram for describing operations of a micromirror at the time of DMD off-state light recycling.

On the other hand, all the micromirrors arranged in the second area 42 are unified into the off state of being tilted by the angle of −φ as in the micromirror 45 illustrated in FIG. 5. Therefore, the DMD off-state recursion light 103 incident on the micromirror from the direction tilted by an angle of about −2φ with respect to the Y axis becomes light 104 (indicated by a one-dot dashed line in the figure) that travels in the direction substantially parallel to the Y axis as illustrated in FIG. 5 according to the law of reflection. Hereinafter, the light which follows such a reflection light path will be referred to as DMD recycling light.

The DMD recycling light 104 follows the light path indicated by a one-dot dashed line in the optical system of FIG. 1 and follows substantially the same light path as the DMD on-state light 101, passes through the first TIR prism 3, the second TIR prism 5, the optical path length correcting prism 6, and the projection lens 7, and is projected and irradiated as effective projection light, which is similar to the DMD on-state light 101, on a predetermined area on the projection surface 20, that is, an area on the projection surface 20 corresponding to the second area 42 in the DMD reflection surface 40. As a result, it is possible to significantly increase the luminance of the predetermined area in the projection image.

That is, by reusing the DMD off-state light, which has been discarded without contributing at all to ensuring the brightness of the projection image in a DMD-mounted imaging device in the related art, as effective projection light by using the above-described DMD off-state light recycling means of the present invention, it is possible to obtain a brighter image than that of a video projector in the related art by increasing the light use efficiency of the video projector.

In addition, a new feature of the present embodiment is that, since the total reflection phenomenon on the sidewall surface of the prism where no light loss occurs is used for an optical path deflecting means for guiding the DMD off-state light 102 to the DMD off-state light recycle optical system 10 and a light path deflecting means for recursively irradiating the DMD reflection surface 40 with the DMD off-state light 102 emitted from the DMD off-state light recycle optical system 10 as the DMD off-state recursion light 103, the light use efficiency in the conversion from the DMD off-state light 102 to the DMD off-state recursion light 103 is very high.

In addition, of course, the embodiment of the DMD off-state light recycle (reuse) optical system 10 is not limited to the embodiment illustrated in FIG. 1 described above, but there is no problem even if, for example, the installation positions and the installation angles of the plane mirror 8 and the toric surface mirror 9 are changed.

Furthermore, the embodiment of the DMD off-state light recycle optical system 10 is not limited to a combination of the plane mirror and the toric surface mirror as described above. As long as an optical system satisfies the above-mentioned specific optical conditions, there is no problem even if, for example, any configuration of an optical system combining a plurality of free curved surface mirrors, an optical system combining a lens and a prism, or the like is employed.

Hereinafter, other embodiments of the DMD off-state light recycle optical system 10 will be described.

Second Embodiment

FIG. 6 is a schematic diagram illustrating an optical system of a video projector according to a second embodiment of the present invention. In the figure, the same components as those in the first embodiment illustrated in FIG. 1 are denoted by the same reference numerals.

In this embodiment, instead of the second TIR prism 5 and the DMD off-state light recycle optical system 10 in the first embodiment, a polygonal prism 60 made of a predetermined optical glass, plastic for optical components, or the like is arranged. The polygonal prism 60 is provided with at least four sidewall surfaces as illustrated in the figure. A sidewall surface 61 is a transmission surface, a sidewall surface 62 is a total reflection surface, and sidewall surfaces 63 and 64 are reflection mirror surfaces. In addition, the reflection mirror surface 63 is configured to a predetermined spherical surface, toric surface, or free curved surface, and the reflection mirror surface 64 is configured to a flat surface. However, of course, the polygonal prism 60 is not limited to an external shape as illustrated in FIG. 6. For example, the reflection mirror surface 63 may be a flat surface, and the reflection mirror surface 64 may be a curved surface. Of course, both the reflection mirror surface 63 and the reflection mirror surface 64 may be curved surfaces.

In the present embodiment, by arranging the polygonal prism 60 as described above, the function of the second TIR prism 5 and the function of the DMD off-state light recycle optical system 10 in the first embodiment can be incorporated into one optical component. As a result, it is possible to reduce the number of components as compared with the first embodiment, and by eliminating the interface between the glass or the plastic for the optical component and the air layer in the optical path of the DMD off-state light 102 and DMD off-state recursion light 103, it is possible to prevent a decrease in light use efficiency caused by reflection loss at the interface.

Third Embodiment

FIG. 7 is a schematic diagram illustrating an optical system of a video projector according to a third embodiment of the present invention. In this figure, the same components as those in the first embodiment illustrated in FIG. 1 and the second embodiment illustrated in FIG. 6 are denoted by the same reference numerals.

This embodiment has substantially the same optical system configuration as that of the first embodiment illustrated in FIG. 1. However, the embodiment is different from the first embodiment in that a color filter 21 is arranged between the second TIR prism 5 and the DMD off-state light recycle optical system 10.

The color filter 21 is a filter (wavelength filter) having predetermined wavelength dependence characteristics at the transmittance. For example, by arranging the color filter 21 in the optical path of the DMD off-state light 102 as illustrated in the figure, it is possible to change the hue of the DMD off-state recursion light 103 relative to the hue of the illumination light 100. As a result, it is possible to simultaneously irradiate the projection surface 20 with two types of the effective projection light having different visibility with respect to the observer.

For example, in a case where the illumination light 100 is white light and, thus, the DMD on-state light 101 is also white light, if a filter with a predetermined amount of reduced transmittance for light having a wavelength corresponding to blue is installed as the color filter 21, it is possible to use the DMD recycling light 104 as substantially yellow light which is more visible to the observer.

In addition, instead of arranging the color filter 21 between the second TIR prism 5 and the DMD off-state light recycle optical system 10 as described above, a predetermined optical multi-layered thin film may be provided on the sidewall surface 53 of the second TIR prism 5 through which the DMD off-state light 102 is transmitted, so that the same transmittance wavelength dependency characteristic as the color filter 21 is obtained.

Furthermore, in a color video projector using the DMD as a video display device, light sources of three primary colors of red, green and blue are generally mounted as illumination light sources, and while these light sources are sequentially lighted at predetermined time intervals, time widths of the on state (generated by DMD on-state light 101) and the off state of each micromirror arranged in the DMD reflection surface are controlled, so that a predetermined full color image is displayed by controlling the hue of effective projection light (DMD on-state light 101) that the observer visually recognizes for each pixel. Therefore, by using the principle, also with respect to the DMD recycling light 104, the time widths of the off state (generation of the DMD recycling light 104) and the on state of each micromirror arranged in the second area 42 are independently controlled, so that the projection surface can be irradiated with the effective projection light (DMD recycling light 104) having a hue different from that of the DMD on-state light 101.

Fourth Embodiment

In the present embodiment, by appropriately optically designing the DMD off-state light recycle optical system 10, the convergence or divergence state of the illumination light 100 to be first irradiated on the reflection surface 40 of the DMD 4 and the convergence or divergence state of the DMD off-state recursion light 103 to be re-irradiated on the second area 42 in the reflection surface 40 can be allowed to be different from each other. As a result, out of the effective projection light emitted from the projection lens 7 toward the projection surface, the convergence or divergence states of the light flux of the DMD on-state light 101 emitted from the first area 41 in the reflection surface 40 and the DMD recycling light 104 emitted the second area 42 can be allowed to be different from each other.

Figure 8:
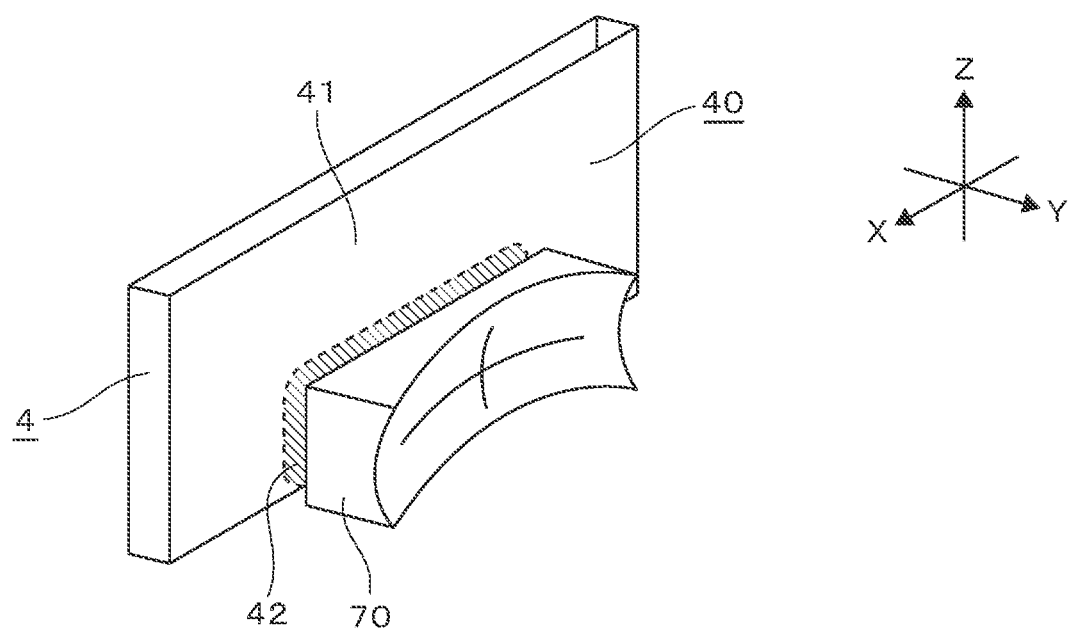
FIG. 8 is a perspective view of main components of a DMD for describing a fourth embodiment of the present invention.

Furthermore, for example, as in the fourth embodiment illustrated in FIG. 8, it is possible to arbitrarily change the imaging position of the DMD recycling light 104 in the optical axis direction (the Y-axis direction in the figure) by arranging a spherical or aspherical lens 70 having an opening of a shape and size substantially matching with the second area 42 immediately before the second area 42 in the reflection surface 40 of the DMD 4, that is, in the optical path between the reflection surface 40 and the sidewall surface 33 (not illustrated in FIG. 9 for better understanding of the figure) of the first TIR prism 3 in the embodiments of FIGS. 1, 6, and 7. As a result, it is possible to arbitrarily expand or reduce the luminance increase area on the projection surface 20 by arbitrarily defocusing the DMD recycling light 104 on the projection surface 20 arranged at the optimum imaging position of the DMD on-state light 101.

In addition, in the embodiment illustrated in FIG. 8, the example is illustrated in which a diverging lens (concave lens) is arranged as the lens 70. However, the present invention is, of course, not limited thereto, and there is no problem even if a predetermined convergent lens (convex lens) may be arranged.

Fifth Embodiment

In each of the above-described embodiments, the example in which the DMD off-state light is efficiently recycled by the control logic for unifying all the micromirrors arranged in the second area 42 in the off state in the video display mode or the fully off mode is illustrated. As another embodiment, all the micromirrors may not be unified into the off state, but at least a portion of the micromirrors may be used in the on state. In the present embodiment, by using the micromirror in the on state, the projection surface 20 can be irradiated with the DMD on-state light 101 obtained directly from the illumination light 100 as the effective projection light, and on the contrary, by using the micromirror in the off state, as described above, the projection surface 20 can be irradiated with the DMD recycling light 104 obtained from the DMD off-state recursion light 103 as the effective projection light.

In general, in the video display mode, since the number of micromirrors in the off state which emit the DMD off-state light 102 is changed as needed, the light amount of the DMD off-state light 102 or the light amount of the DMD off-state recursion light 103 obtained from the DMD off-state light 102 is also changed as needed. Therefore, among the micromirrors arranged in the second area 42, the number and distribution (installation position) of the micromirrors in the on state by which the effective projection light (DMD on-state light 101) is directly obtained from the illumination light 100 and conversely, the number and distribution (installation position) of the micromirrors in the off state by which the effective projection light (DMD recycling light 104) is obtained from the DMD off-state recursion light 103 are appropriately controlled by a predetermined control logic, so that the effective projection light amount (the sum of the light amount of the DMD on-state light 101 and the light amount of the DMD recycling light) projected and irradiated on the projection surface can be successively maximized, and thus, the brightness (luminance) of the projection image can be always maintained in an optimum state.

Sixth Embodiment

In each of the embodiments described above, the example is illustrated in which both of the first area 41 and the second area 42, that is, the entire reflection surface 40 of the DMD 4 are illuminated with the illumination light 100. However, the present invention is, of course, not limited thereto. As another embodiment, for example, a configuration in which only the first area 41 is intensively irradiated with the illumination light 100 can also be employed. In the present embodiment, the second area 42 is re-irradiated with the DMD off-state recursion light 103 generated only from the DMD off-state light 102 generated in the first area 41. (On the other hand, in each of the embodiments described above, the DMD off-state recursion light is also generated from the DMD off-state light generated in the second area 42 itself).

In this embodiment, also in the second area 42 in addition to the first area 41, it is possible to display an image independent of the image displayed in the first area 41 by selectively switching the off state or the on state of each micromirror arranged in the second area 42 according to the control signal generated on the basis of a predetermined video display signal. However, in the second area 42, contrary to the video display form in the first area 41, the effective projection light emitted from the micromirror in the off state to the projection surface is generated, and the light reflected on the micromirror in the on state becomes ineffective light that is not irradiated to the projection surface. That is, it is necessary to invert the relationship between the video display signal and the on/off control signal of the micromirror with respect to that in the divided first area 41.

Seventh Embodiment

Figure 9:
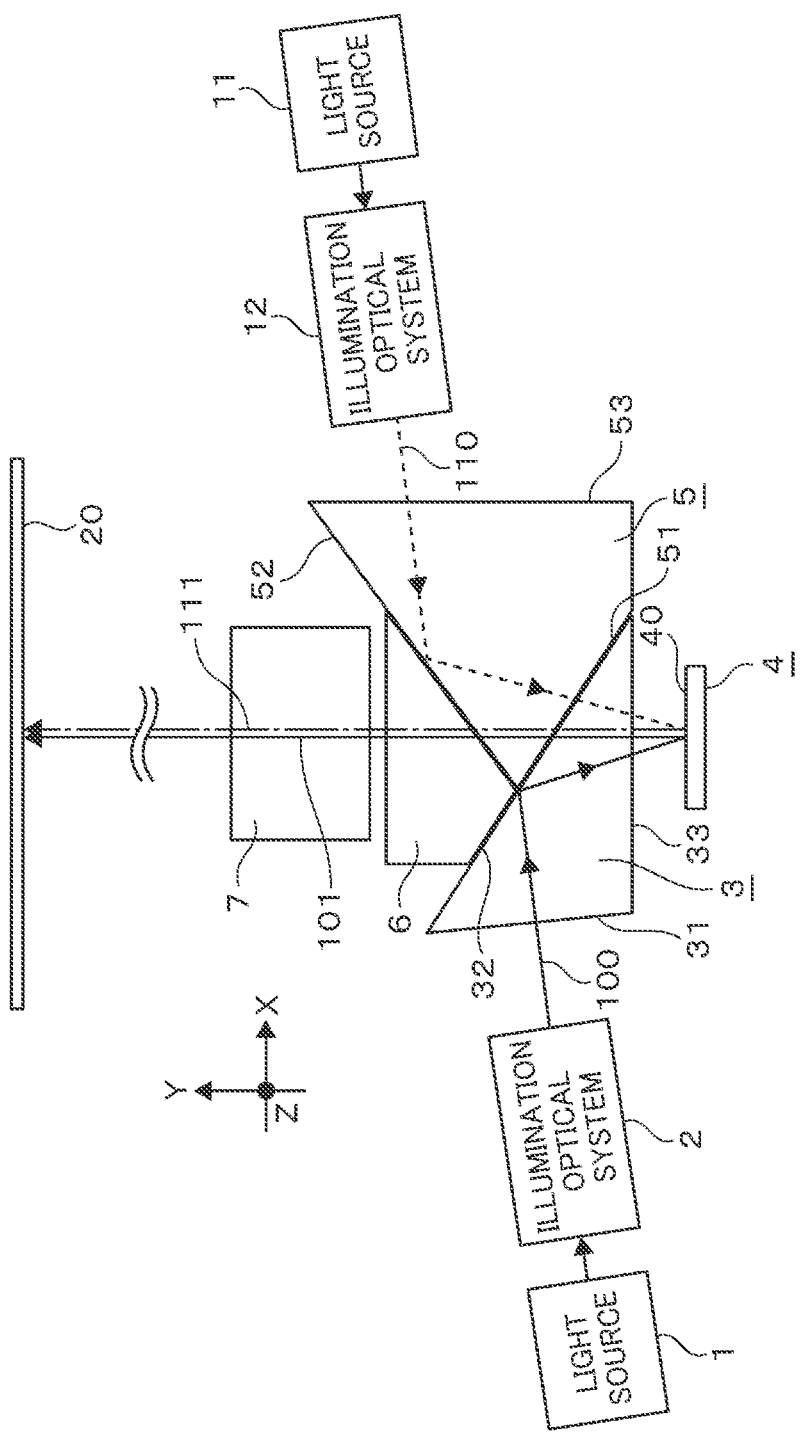
FIG. 9 is a schematic diagram of an optical system of a video projector according to a seventh embodiment of the present invention.

FIG. 9 is a schematic diagram illustrating an optical system of a video projector according to a seventh embodiment of the present invention. In this figure, the same components as those in the embodiments illustrated in FIGS. 1, 6, and 7 are denoted by the same reference numerals.

In the present embodiment, as in the sixth embodiment, in the case of having a function of displaying an image independent of the image displayed in the first area 41 by intensively irradiating only the first area 41 with the illumination light 100 and selectively switching the off state or the on state of each of the micromirrors arranged in the second area 42 according to the control signal generated on the basis of the predetermined video display signal in the second area 42 in addition to the first area 41 in the reflection surface 40 of the DMD 4, as in the embodiment illustrated in FIG. 9, instead of the DMD off-state light recycle optical system 10, the light source 11 that generates the illumination light 110 for intensively illuminating only the second area 42 and an illumination optical system 12 are arranged.

Thus, by generating the illumination light 100 for intensively illuminating only the first area 41 and the illumination light 110 for intensively illuminating only the second area 42 by independent light sources and illumination optical systems, respectively, it is possible to irradiate the projection surface with two types of effective projection light having different hues or different convergence or divergence states while using a single DMD or a projection lens as the video display device.

Although the embodiments have been described above, the present invention is not limited to the above-described embodiments, and the present invention may include various modifications. For example, the above-described embodiments are described in detail to describe the present invention for the better understanding, and the present invention is not necessarily limited to one having all the described configurations. In addition, a portion of the configuration of one embodiment may be replaced with the configuration of another embodiment, and the configuration of another embodiment can be added to the configuration of one embodiment. In addition, it is possible to add, delete, and replace other configurations with respect to a portion of the configurations of each embodiment.

REFERENCE SIGNS LIST

3 First TIR prism
4 DMD
5 Second TIR prism
6 Optical path length correcting prism
7 Projection lens
10 DMD off-state light recycle optical system
20 Projection surface
40 DMD reflection surface
45 Micromirror
100 Illumination light
101 DMD on-state light
102 DMD off-state light
103 DMD off-state recursion light
104 DMD recycling light

The invention claimed is:

1. A video projector for projecting an image, comprising:
a video display element having a reflection surface in which a plurality of micromirror surfaces which are selectively tilted in a first direction and a second direction which are different from each other and are regularly arranged;
an illumination light source that irradiates the reflection surface with predetermined illumination light; and
a projection lens having a function of projecting and irradiating a predetermined projection surface with illumination light that is reflected by at least the micromirror surface tilted in at least the first direction among the illumination light which irradiates the reflection surface,
wherein the reflection surface is divided into at least a first area and a second area,
wherein each of the micromirror surfaces in the first area selectively switches tilting in the first direction or the second direction on the basis of a predetermined first control signal,
wherein each of the micromirror surfaces in the second area selectively switches the tilting in the first direction or the second direction on the basis of a predetermined second control signal which is different from the first control signal,
wherein the video projector further provides light recursion allowing the illumination light reflected from the micromirror surfaces tilted in the second direction among the micromirror surfaces in the first area and the second area to follow a predetermined optical path and allowing the second area to be recursively irradiated with the reflected illumination light from a direction different from that of the illumination light,
wherein the projection surface is projected and irradiated through the projection lens with the light reflected by the micromirror surface tilted in the second direction which recursively irradiates the second area, and
wherein the second control signal has a function of controlling a tilting condition of each of the micromirror surfaces in the second area according to a tilting condition of each of the micromirror surfaces in the first area which is selectively switched according to the first control signal.

2. The video projector according to claim 1,
wherein in a first state in which all of the micromirror surfaces in the first area are tilted in the first direction, all the micromirror surfaces in the second area are tilted in the first direction,
wherein in a second state in which the micromirror surfaces tilted in the first direction and the micromirror surfaces tilted in the second direction are mixed in the first area, all the micromirror surfaces in the second direction select either a state of being tilted in the first direction or a state of being tilted in the second direction according to the number of the micromirror surfaces tilted in the second direction, and wherein in a third state in which all the micromirror surfaces in the first area are tilted in the second direction, all the mirror surfaces in the second area are controlled by the second control signal so as to be tilted in the second direction.

3. The video projector according to claim 1,
wherein the light recursion includes at least two reflection mirrors having a flat surface, a spherical surface, or a free curved surface.

4. The video projector according to claim 1,
wherein the light recursion includes at least a polygonal optical prism having at least one curved sidewall surface.

* * * * *